(12) United States Patent
Hu et al.

(10) Patent No.: US 9,258,029 B2
(45) Date of Patent: Feb. 9, 2016

(54) PROTECTIVE SHEATH

(71) Applicant: E Ink Holdings Inc., Hsinchu (TW)

(72) Inventors: Wu-Yang Hu, Hsinchu (TW); Shao-Pei Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 18 days.

(21) Appl. No.: 14/472,402

(22) Filed: Aug. 29, 2014

(65) Prior Publication Data
US 2015/0188593 A1  Jul. 2, 2015

(30) Foreign Application Priority Data

Dec. 27, 2013 (TW) .............................. 102148781 A

(51) Int. Cl.
*H04M 1/00* (2006.01)
*H04B 1/3888* (2015.01)

(52) U.S. Cl.
CPC .................................... *H04B 1/3888* (2013.01)

(58) Field of Classification Search
CPC .................................................... H04B 1/3888
USPC .............. 455/575.8, 90.3, 566, 575.3, 575.1; 224/196, 183; 361/679.55, 679.01, 361/679.56; 278/688; 345/173, 1.3, 174, 345/156; 206/320, 45.25, 472; 248/688
See application file for complete search history.

(56) References Cited

U.S. PATENT DOCUMENTS

| | | | |
|---|---|---|---|
| 2003/0064751 A1 | 4/2003 | Charlier et al. | |
| 2012/0018324 A1* | 1/2012 | Hale | F16M 11/041 206/320 |
| 2012/0106078 A1* | 5/2012 | Probst | G06F 1/1616 361/679.56 |
| 2012/0194448 A1* | 8/2012 | Rothkopf | A45C 13/002 345/173 |
| 2013/0098782 A1* | 4/2013 | Diebel | A45C 11/00 206/45.25 |
| 2013/0258586 A1* | 10/2013 | Shao | A45C 11/00 361/679.55 |
| 2013/0328825 A1* | 12/2013 | Brown | G06F 3/01 345/174 |
| 2014/0104761 A1* | 4/2014 | Hsu | H05K 7/1401 361/679.01 |
| 2014/0216971 A1* | 8/2014 | Ashley | A45C 11/00 206/472 |
| 2015/0069099 A1* | 3/2015 | Diebel | A45C 11/00 224/196 |

(Continued)

FOREIGN PATENT DOCUMENTS

| CN | 201974731 | 9/2011 |
|---|---|---|
| TW | I224722 | 12/2004 |

(Continued)

OTHER PUBLICATIONS

"Office Action of Taiwan Counterpart Application", issued on Jul. 17, 2015, p. 1-p. 6.

*Primary Examiner* — Tan H Trinh
(74) *Attorney, Agent, or Firm* — Jianq Chyun IP Office

(57) ABSTRACT

A protective sheath includes a first cover portion, a flexible display unit, a second cover portion, a flexible portion, and a control unit. The first cover portion includes an external surface portion having an opening and an internal surface portion. The flexible display unit is sandwiched between the external and internal surface portions. A second display surface of the flexible display unit is exposed by the opening. The second cover portion has two bending openings. The second cover portion is bent along the bending openings to be divided into a leaning portion and a supporting portion. Two opposite sides of the flexible portion are foldably connected to the first cover portion and the supporting portion of the second cover portion. The control unit is disposed in an accommodating space of the supporting portion and electrically connected to the flexible display unit.

10 Claims, 5 Drawing Sheets

(56) References Cited

U.S. PATENT DOCUMENTS

| | | | |
|---|---|---|---|
| 2015/0119114 A1* | 4/2015 | Smith | G06F 1/16 455/566 |
| 2015/0136933 A1* | 5/2015 | Merzon | G06F 1/1626 248/450 |
| 2015/0161803 A1* | 6/2015 | Sip | G06T 11/001 345/593 |
| 2015/0241918 A1* | 8/2015 | Igarashi | G06F 1/1626 455/575.8 |

FOREIGN PATENT DOCUMENTS

| | | |
|---|---|---|
| TW | 200726057 | 7/2007 |
| TW | M390687 | 10/2010 |
| TW | M421594 | 1/2012 |
| TW | M443438 | 12/2012 |
| TW | M444075 | 1/2013 |
| TW | M445325 | 1/2013 |
| TW | M458859 | 8/2013 |
| WO | 9967702 | 12/1999 |

\* cited by examiner

PROTECTIVE SHEATH

CROSS-REFERENCE TO RELATED APPLICATION

This application claims the priority benefit of Taiwan application serial no. 102148781, filed on Dec. 27, 2013. The entirety of the above-mentioned patent application is hereby incorporated by reference herein and made a part of this specification.

BACKGROUND OF THE INVENTION

1. Field of the Invention

The invention relates to a protective sheath and more particularly relates to a protective sheath adapted for a tablet computer.

2. Description of Related Art

Due to the rapid development of technology, portable electronic devices, such as tablet computer or smart phone, having advantages of portability and simple operation have been used extensively. However, when the user carries about the portable electronic device, the portable electronic device receives impact from time to time, which may damage the portable electronic device or cause an external case thereof to wear. As a solution to the aforementioned issues, various types of protective sheaths are available in the market. However, the protective sheaths currently in the market only provide protection and are insufficient to satisfy the user's demand for diverse product functions.

SUMMARY OF THE INVENTION

The invention provides a protective sheath that is multifunctional and convenient to use.

The protective sheath of the invention is adapted for covering and supporting a tablet device. The protective sheath includes a first cover portion, a flexible display unit, a second cover portion, a flexible portion, and a control unit. The first cover portion covers a first display surface of the tablet device. The first cover portion includes an external surface portion having an opening and an internal surface portion. The flexible display unit is sandwiched between the external surface portion and the internal surface portion of the first cover portion, and the opening of the external surface portion exposing a second display surface of the flexible display unit. The second cover portion covers a back surface of the tablet device that is opposite to the first display surface. The second cover portion has two bending openings, and the second cover portion is bent along the bending openings to be divided into a leaning portion and a supporting portion. The leaning portion is adapted to be leaned against by the back surface of the tablet device and the supporting portion is adapted for supporting and standing the tablet device on the internal surface portion of the first cover portion, and the supporting portion has an accommodating space. The flexible portion has two opposite sides that are foldably connected to the first cover portion and the supporting portion of the second cover portion, and the flexible portion covers a side surface of the tablet device. The control unit is disposed in the accommodating space of the supporting portion of the second cover portion to be electrically connected with the flexible display unit.

In an embodiment of the invention, the internal surface portion of the first cover portion includes at least one anti-slip structure. When the second cover portion is bent with respect to the first cover portion, the leaning portion is adapted for standing the tablet device on the first cover portion in a longitudinal direction of the back surface, and the tablet device is fixed on the internal surface portion by the anti-slip structure.

In an embodiment of the invention, the external surface portion and the internal surface portion of the first cover portion have a first extending portion and a second extending portion respectively. The first extending portion and the second extending portion are disposed opposite to each other and connected with each other, and the first extending portion has an accommodating slot. The protective sheath further includes a first element and a second element. The first element is disposed in the accommodating slot to be in contact with the second extending portion. The second element is disposed on the leaning portion of the second cover portion, wherein a magnetic attraction force exists between the first element and the second element to force the second extending portion to be in contact with the second cover portion.

In an embodiment of the invention, one of the first element and the second element is a magnetizing element and the other one of the first element and the second element is a magnetic-sensing element.

In an embodiment of the invention, the flexible display unit is an electrophoretic display thin film.

In an embodiment of the invention, the tablet device is electrically connected to the flexible display unit in a wired or wireless manner.

In an embodiment of the invention, patterns of the bending openings of the second cover portion are mirror patterns.

In an embodiment of the invention, the second cover portion further includes a bending line located between the leaning portion and supporting portion, and two ends of the bending line are respectively connected with the bending openings.

In an embodiment of the invention, the second cover portion further includes a cover plate portion pivoted to the supporting portion and adapted for covering the accommodating space.

In an embodiment of the invention, the control unit is a circuit board.

Based on the above, the protective sheath of the invention not only provides the functions of covering and protecting the tablet device but also can be transformed into a support stand easily for supporting the tablet device. In addition, the protective sheath of the invention has the flexible display unit that is electrically connected with the control unit. Therefore, the protective sheath of the invention further provides a display function. In other words, the protective sheath of the invention satisfies the user's demand for diverse product functions.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
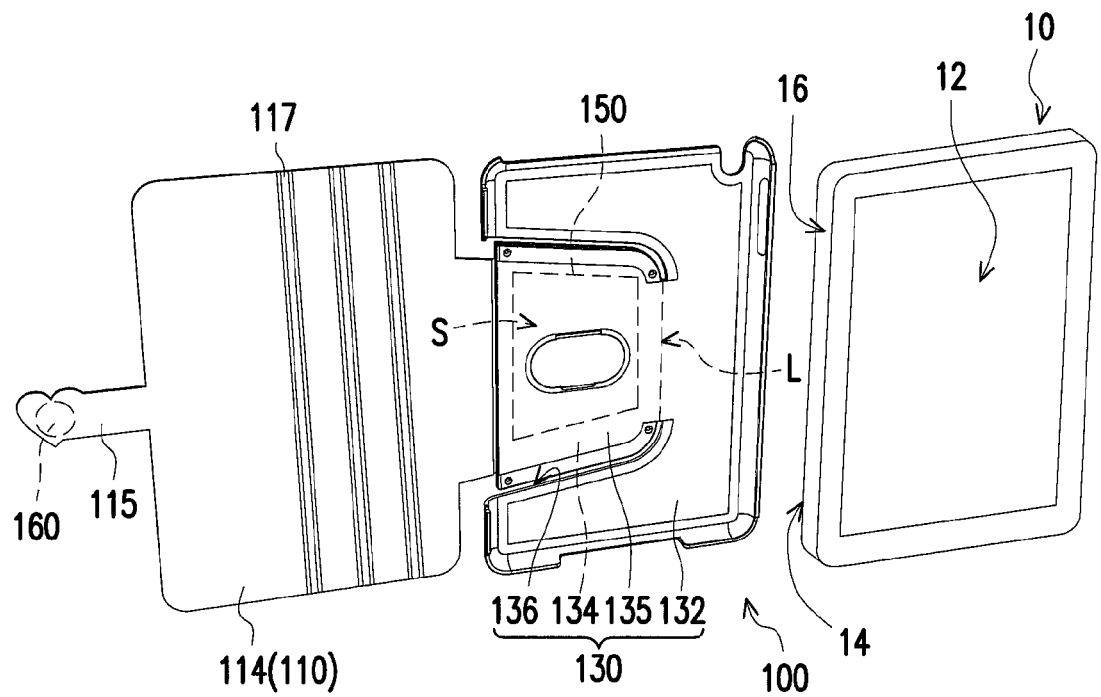
FIG. 1 is a schematic diagram illustrating a tablet device to be installed to a protective sheath according to an embodiment of the invention.
Figure 2:
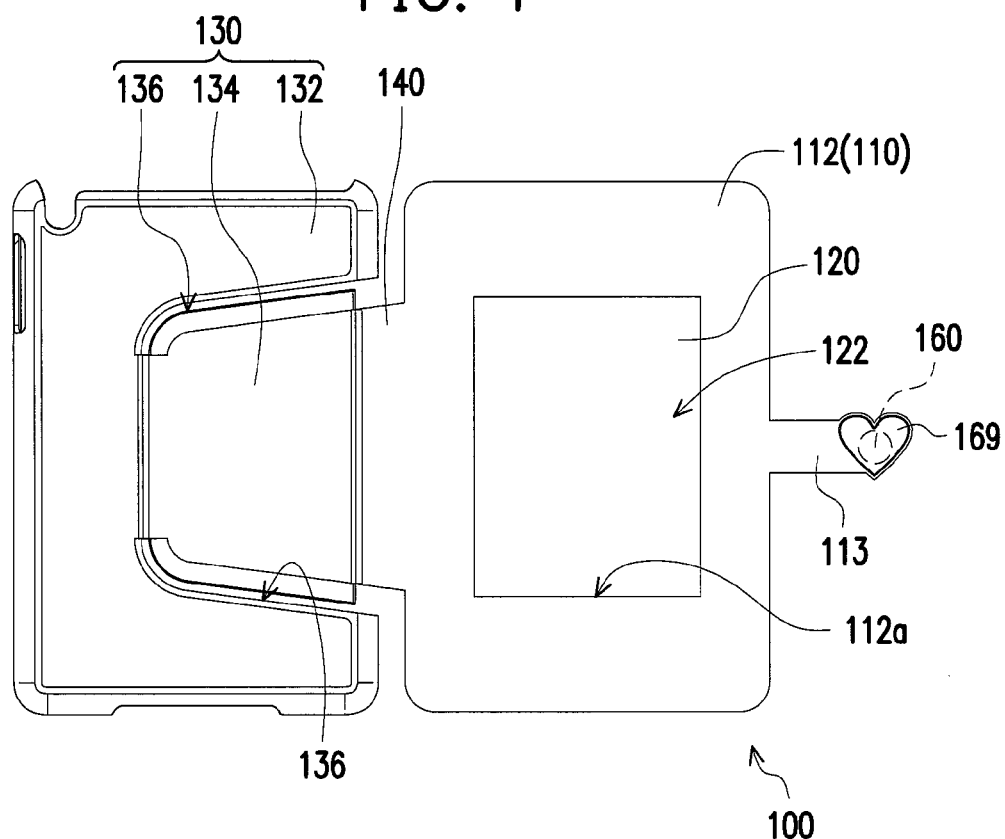
FIG. 2 is a schematic front view of the protective sheath of FIG. 1.
Figure 3:
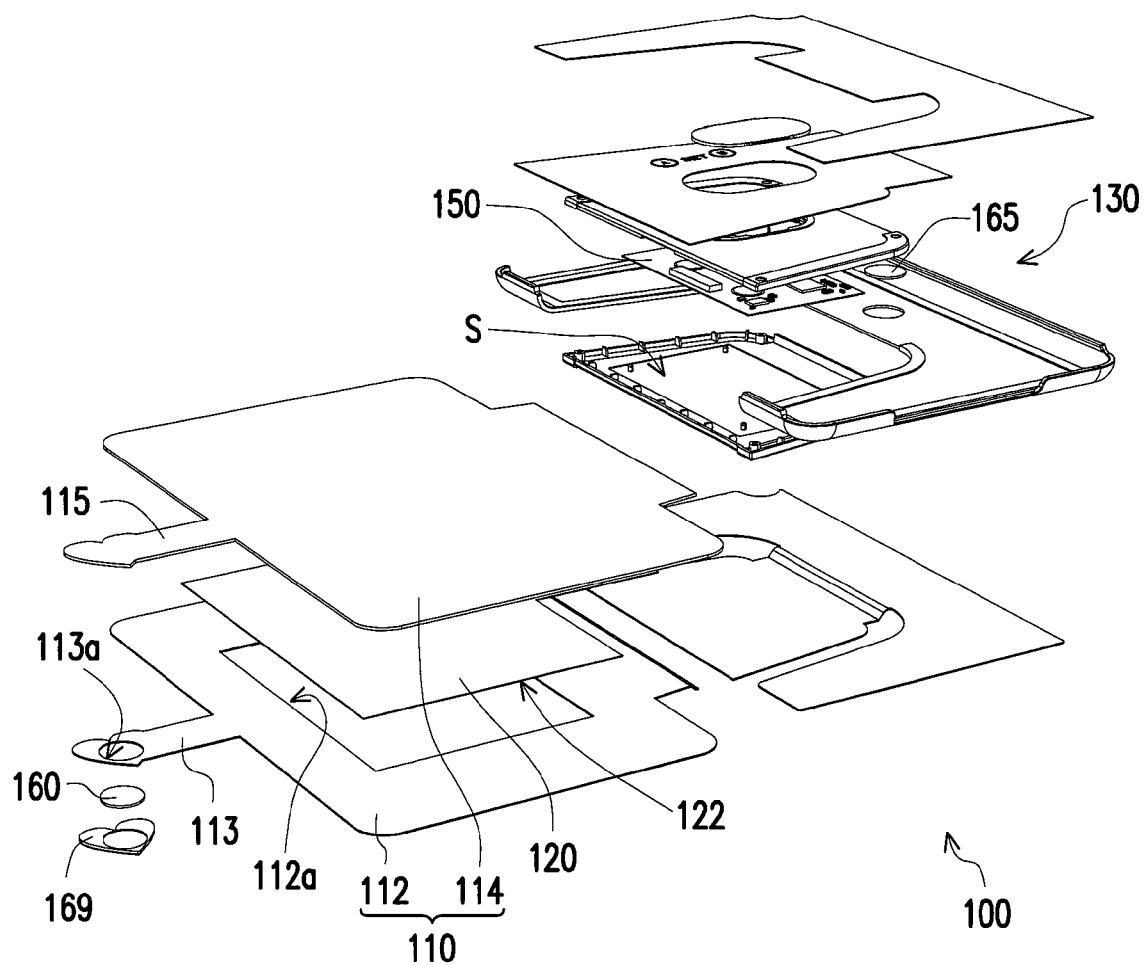
FIG. 3 is a perspective exploded view of the protective sheath of FIG. 1.
Figure 4:
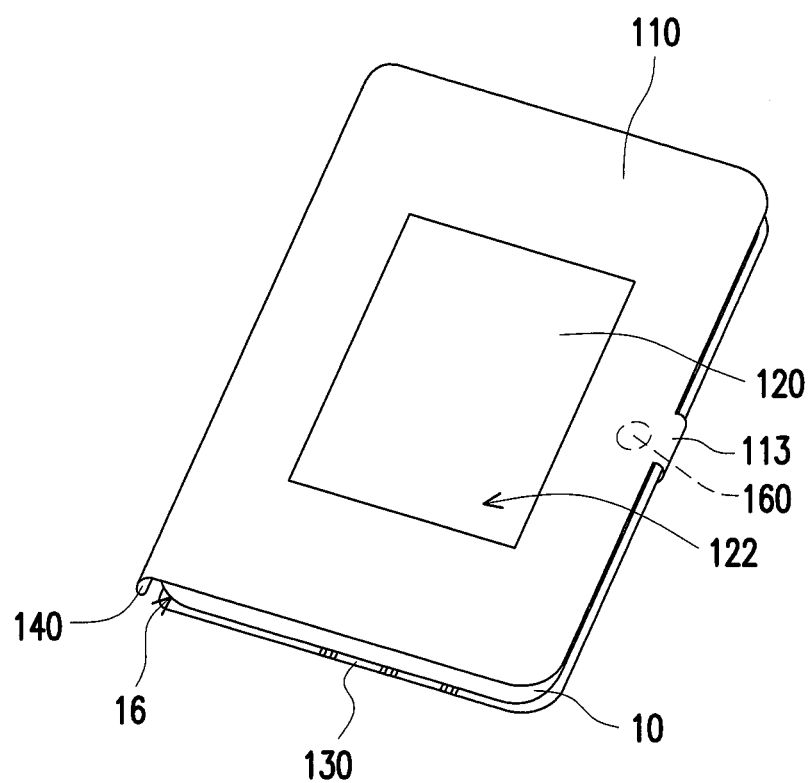
FIG. 4 is a schematic view of the protective sheath of FIG. 1 with the tablet device covered therein.
Figure 5:
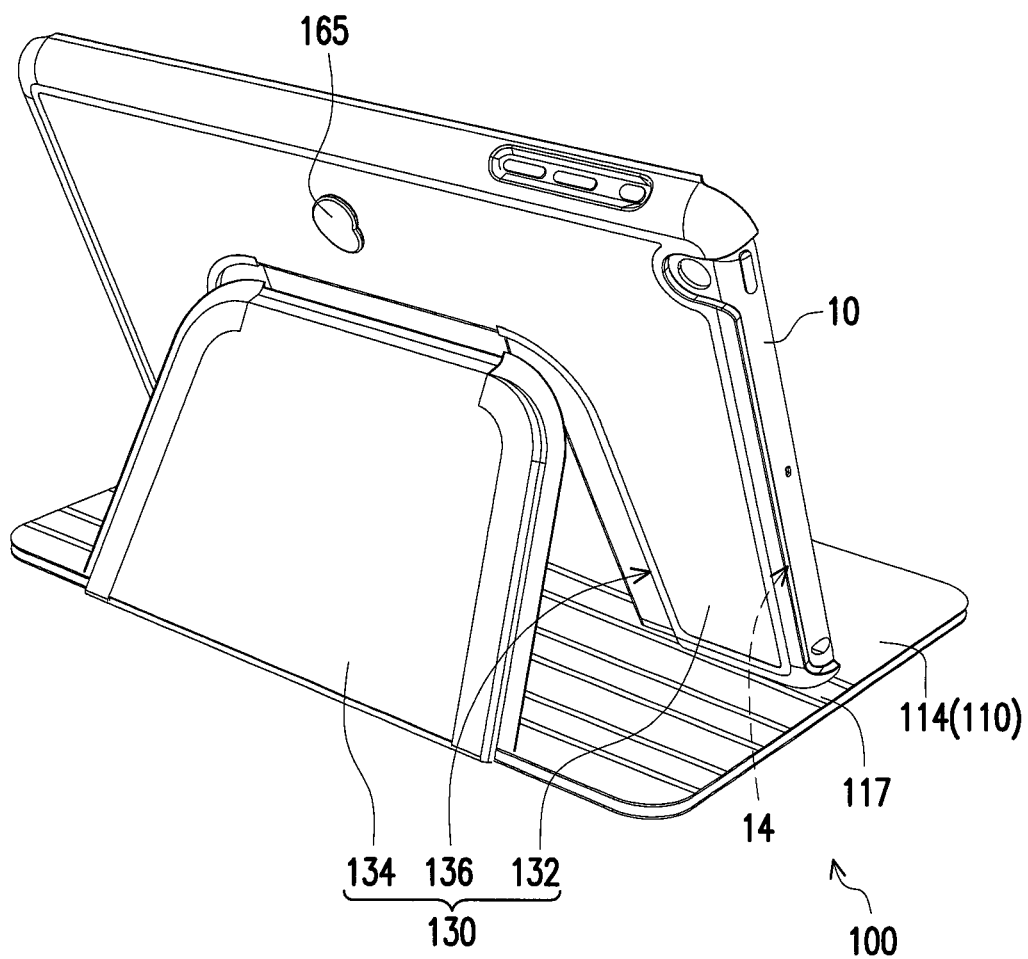
FIG. 5 is a perspective view of the protective sheath of FIG. 1 supporting the tablet device after transformation.

FIG. 1 is a schematic diagram illustrating a tablet device to be installed to a protective sheath according to an embodiment of the invention. FIG. 2 is a schematic front view of the protective sheath of FIG. 1. FIG. 3 is a perspective exploded view of the protective sheath of FIG. 1. FIG. 4 is a schematic view of the protective sheath of FIG. 1 with the tablet device covered therein. FIG. 5 is a perspective view of the protective sheath of FIG. 1 supporting the tablet device after transformation. First, with reference to FIG. 1, a protective sheath 100 of this embodiment is adapted for covering and supporting a tablet device 10, wherein the tablet device 10 has a first display surface 12, a back surface 14 opposite to the first display surface 12, and a side surface 16 connected between the first display surface 12 and the back surface 14. Herein, the tablet device 10 disclosed in this embodiment is a tablet computer, for example; however, the invention is not limited thereto.

With reference to FIG. 2, FIG. 3, FIG. 4, and FIG. 5, in this embodiment, the protective sheath 100 includes a first cover portion 110, a flexible display unit 120, a second cover portion 130, a flexible portion 140, and a control unit 150. More specifically, the first cover portion 110 of this embodiment is adapted for covering the first display surface 12 of the tablet device 10. The first cover portion 110 includes an external surface portion 112 and an internal surface portion 114, and the external surface portion 112 has an opening 112a. The flexible display unit 120 is sandwiched between the external surface portion 112 and the internal surface portion 114 of the first cover portion 110, and the opening 112a of the external surface portion 112 exposes a second display surface 122 of the flexible display unit 120. Herein, the flexible display unit 120 may be an electrophoretic display thin film used for independently displaying time or a preset pattern, or displaying information set to be outputted by the tablet device 10, so as to increase applicability of the protective sheath 100.

The second cover portion 130 is foldably connected to the first cover portion 110 and covers the back surface 14 opposite to the first display surface 12 of the tablet device 10. The second cover portion 130 has two bending openings 136, and the second cover portion 130 is bent along the bending openings 136 to be divided into a leaning portion 132 and a supporting portion 134. As shown in FIG. 1 and FIG. 5, the patterns of the bending openings 136 of this embodiment are substantially mirror patterns. However, it should be noted that the invention is not limited thereto. Referring to FIG. 5, the leaning portion 132 of the second cover portion 130 is adapted to be leaned against by the back surface 14 of the tablet device 10. The supporting portion 134 of the second cover portion 130 is adapted for supporting and standing the tablet device 10 on the internal surface portion 114 of the first cover portion 110. In addition, as shown in FIG. 3, the supporting portion 134 of this embodiment has an accommodating space S, and the control unit 150 is disposed in the accommodating space S of the supporting portion 134 and is electrically connected with the flexible display unit 120, wherein the control unit 150 is a circuit board, for example. As shown in FIG. 2, two opposite sides of the flexible portion 140 are foldably connected to the first cover portion 110 and the supporting portion 134 of the second cover portion 130. The flexible portion 140 covers the side surface 16 of the tablet device 10.

To be more specific, the external surface portion 112 and the internal surface portion 114 of the first cover portion 110 of this embodiment have a first extending portion 113 and a second extending portion 115 respectively. The first extending portion 113 and the second extending portion 115 are disposed opposite to each other and connected with each other. The first extending portion 113 has an accommodating slot 113a. The protective sheath 100 further includes a first element 160 and a second element 165, wherein the first element 160 is disposed in the accommodating slot 113a to be in contact with the second extending portion 115. The second element 165 is disposed on the leaning portion 132 of the second cover portion 130. In this embodiment, a magnetic attraction force exists between the first element 160 and the second element 165 to force the second extending portion 115 to be in contact with the second cover portion 130, wherein one of the first element 160 and the second element 165 is a magnetizing element, and the other one of the first element 160 and the second element 165 is a magnetic-sensing element. For aesthetic consideration, the protective sheath 100 of this embodiment may selectively include a decorative element 169 that covers the first element 160 and is connected with the first extending portion 113.

The second cover portion 130 of this embodiment further has a bending line L located between the supporting portion 134 and the leaning portion 132, and two opposite ends of the bending line L are connected with the bending openings 136 respectively. Besides, the second cover portion 130 further has a cover plate portion 135, wherein the cover plate portion 135 is pivoted to the supporting portion 134 and is adapted to cover the accommodating space S. In other words, when replacing or maintaining the control unit 150, the cover plate portion 135 can be lifted open for taking the control unit 150 out of the accommodating space S of the supporting portion 134 or for maintaining the control unit 150 therein directly. In particular, the tablet device 10 may be electrically connected to the flexible display unit 120 in the protective sheath 100 in a wired or wireless manner, so as to display a message on the tablet device 10 directly in the flexible display unit 120.

Moreover, in this embodiment, the internal surface portion 114 of the first cover portion 110 has at least one anti-slip structure 117. When the second cover portion 130 is bent with respect to the first cover portion 110, the leaning portion 132 is adapted for standing the tablet device 10 on the first cover portion 110 in a longitudinal direction of the back surface 14, and the tablet device 10 is fixed on the internal surface portion 114 due to the anti-slip structure 117. That is to say, the anti-slip structure 117 provides friction for maintaining the tablet device 10 at the same position, such that the tablet device 10 stands firmly on the first cover portion 110, as shown in FIG. 5, and does not fall or damage.

Figure 6A:
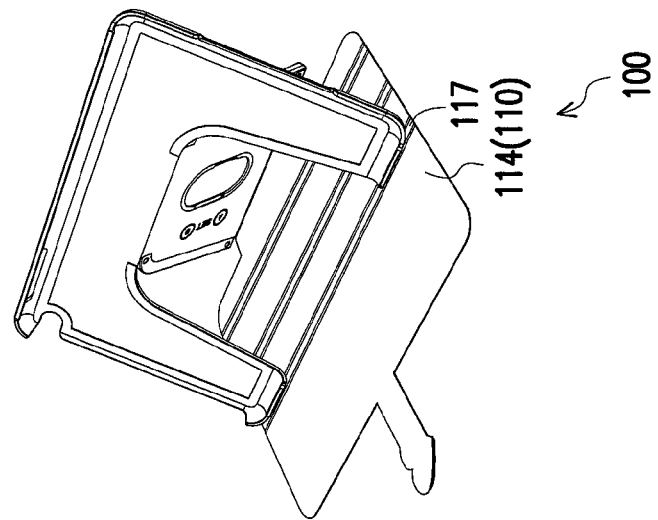
FIG. 6A to FIG. 6C are schematic front views illustrating the protective sheath of FIG. 5 supporting the tablet device at different tilt angles.
Figure 6B:
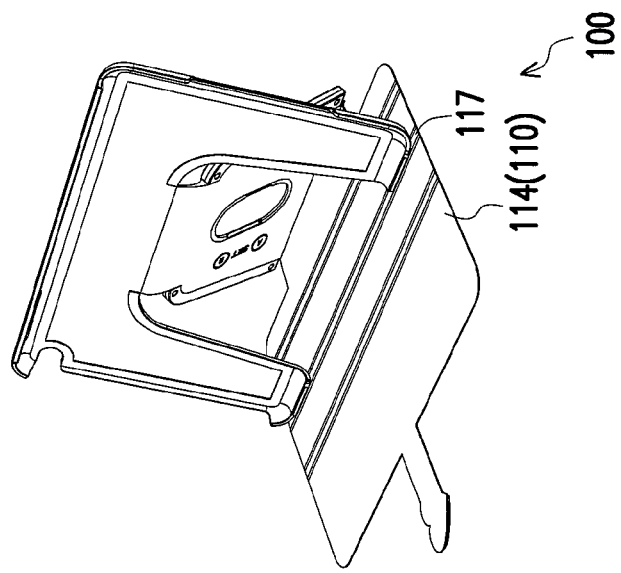
Figure 6C:
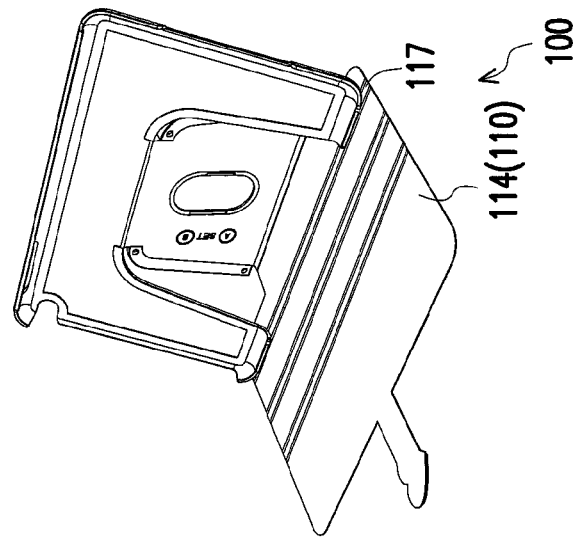

FIG. 6A to FIG. 6C are schematic front views illustrating the protective sheath of FIG. 5 supporting the tablet device at different tilt angles. To facilitate the illustration, the tablet device 10 is omitted from FIG. 6A to FIG. 6C. Referring to FIG. 5 and FIG. 6A to FIG. 6C, the internal surface portion 114 of the first cover portion 110 has three anti-slip structures 117 for the user to adjust the angle that the tablet device 10 is stood and, fixed (see FIG. 5) on the first cover portion 110 according to the user's requirement.

Because the protective sheath 100 of this embodiment is provided with the first cover portion 110 and the second cover portion 130, the protective sheath 100 has the function of covering the tablet device 10, so as to reduce the influence of external impact on the tablet device 10 and further protect the tablet device 10. In addition, the second cover portion 130 of this embodiment is designed with the bending openings 136. Thus, the second cover portion 130 can be bent along the bending openings 136 to be divided into the leaning portion 132 to be leaned against by the back surface 14 of the tablet device 10 and the supporting portion 134 that supports and stands the tablet device 10 on the internal surface portion 114 of the first cover portion 110. In other words, the protective sheath 100 of this embodiment can be easily transformed into a support stand for supporting the tablet device 10. Furthermore, because the protective sheath 100 of this embodiment has the flexible display unit 120 that is electrically connected with the control unit 150, the protective sheath 100 of this embodiment has a display function. Simply put, in comparison with the conventional protective sheath that not only has the protection function, the protective sheath 100 of this embodiment has multiple functions and thus has advantages.

To sum up, the protective sheath of the invention not only provides the functions of covering and protecting the tablet device but also can be transformed into the support stand easily for supporting the tablet device. In addition, the protective sheath of the invention has the flexible display unit that is electrically connected with the control unit. Therefore, the protective sheath of the invention further provides the display function. That is, the protective sheath of the invention satisfies the user's demand for diverse product functions.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A protective sheath, adapted for covering and supporting a tablet device, the protective sheath comprising:
    a first cover portion covering a first display surface of the tablet device and the first cover portion comprising an external surface portion and an internal surface portion, and the external surface portion having an opening;
    a flexible display unit sandwiched between the external surface portion and the internal surface portion of the first cover portion, and the opening of the external surface portion exposing a second display surface of the flexible display unit;
    a second cover portion covering a back surface of the tablet device that is opposite to the first display surface, and the second cover portion comprising two bending openings along which the second cover portion is bent and divided into a leaning portion and a supporting portion, wherein the leaning portion is adapted to be leaned against by the back surface of the tablet device and the supporting portion is adapted for supporting and standing the tablet device on the internal surface portion of the first cover portion, and the supporting portion has an accommodating space;
    a flexible portion comprising two opposite sides foldably connected to the first cover portion and the supporting portion of the second cover portion, and the flexible portion covering a side surface of the tablet device; and
    a control unit disposed in the accommodating space of the supporting portion of the second cover portion to be electrically connected with the flexible display unit.

2. The protective sheath as recited in claim 1, wherein the internal surface portion of the first cover portion comprises at least one anti-slip structure, and when the second cover portion is bent with respect to the first cover portion, the leaning portion is adapted for standing the tablet device on the first cover portion in a longitudinal direction of the back surface, and the tablet device is fixed on the internal surface portion by the anti-slip structure.

3. The protective sheath as recited in claim 1, wherein the external surface portion and the internal surface portion of the first cover portion comprise a first extending portion and a second extending portion respectively, the first extending portion and the second extending portion are disposed opposite to each other and connected with each other, and the first extending portion has an accommodating slot, and the protective sheath further comprises:
    a first element disposed in the accommodating slot to be in contact with the second extending portion; and
    a second element disposed on the leaning portion of the second cover portion, wherein a magnetic attraction force exists between the first element and the second element to force the second extending portion to be in contact with the second cover portion.

4. The protective sheath as recited in claim 3, wherein one of the first element and the second element is a magnetizing element and the other one of the first element and the second element is a magnetic-sensing element.

5. The protective sheath as recited in claim 1, wherein the flexible display unit is an electrophoretic display thin film.

6. The protective sheath as recited in claim 1, wherein the tablet device is electrically connected to the flexible display unit in a wired or wireless manner.

7. The protective sheath as recited in claim 1, wherein patterns of the bending openings of the second cover portion are mirror patterns.

8. The protective sheath as recited in claim 7, wherein the second cover portion further comprises a bending line located between the supporting portion and leaning portion, and two ends of the bending line are respectively connected with the bending openings.

9. The protective sheath as recited in claim 1, wherein the second cover portion further comprises a cover plate portion pivoted to the supporting portion and the cover plate portion adapted for covering the accommodating space.

10. The protective sheath as recited in claim 1, wherein the control unit is a circuit board.

* * * * *